(12) United States Patent
Payne et al.

(10) Patent No.: US 6,993,258 B2
(45) Date of Patent: Jan. 31, 2006

(54) WDM TRANSMITTER

(75) Inventors: David Neil Payne, Hamble (GB);
Michael Nickolaos Zervas,
Southampton (GB); Morten Ibsen,
Southampton (GB)

(73) Assignee: University of Southampton,
Hampshire (GB)

( * ) Notice: Subject to any disclaimer, the term of this patent is extended or adjusted under 35 U.S.C. 154(b) by 504 days.

(21) Appl. No.: 09/931,286

(22) Filed: Aug. 16, 2001

(65) Prior Publication Data

US 2002/0154355 A1    Oct. 24, 2002

Related U.S. Application Data

(63) Continuation-in-part of application No. PCT/GB00/00583, filed on Feb. 18, 2000.

(30) Foreign Application Priority Data

Feb. 19, 1999  (GB)  ..................... 9903880

(51) Int. Cl.
    *H04J 14/02*  (2006.01)
(52) U.S. Cl. .................. 398/92; 398/182; 398/183;
    398/192; 398/195; 398/196; 398/197; 398/200;
    398/22; 398/23; 398/45; 398/79; 398/49;
    398/157; 359/341; 359/337; 359/345; 372/6;
    372/70; 372/40; 385/24; 385/37; 385/1; 385/4
(58) Field of Classification Search ............... 398/182,
    398/22, 23, 101, 68, 92, 110, 200, 183, 192,
    398/195, 196, 197, 79, 45, 49, 157; 359/341,
    359/337, 345; 372/70, 6, 40; 385/24, 1,
    385/37, 4
See application file for complete search history.

(56) References Cited

U.S. PATENT DOCUMENTS

| 5,241,414 A | * | 8/1993 | Giles et al. | ............ 359/341.33 |
| 5,574,589 A | * | 11/1996 | Feuer et al. | .................. 398/92 |
| 5,796,504 A | * | 8/1998 | Sonderegger et al. | ....... 398/110 |
| 5,870,216 A | * | 2/1999 | Brock et al. | .................. 398/49 |

(Continued)

FOREIGN PATENT DOCUMENTS

GB    2 295 921 A    6/1996

(Continued)

OTHER PUBLICATIONS

Srivastava, A. K. et al. "1 Tb/s Transmission of 100 WDM 10 Gb/s Channels Over 400km of TrueWave™ Fiber." *OFC 98 Technical Digest, paper PD10* 1998.

(Continued)

*Primary Examiner*—Hanh Phan
(74) *Attorney, Agent, or Firm*—Renner, Otto, Boisselle & Sklar, LLP (57) ABSTRACT

A WDM transmitter comprising an array of M pump lasers multiplexed by an M×N multiplexer, in the form of a coupler, and used to feed an array of N optically pumped fiber lasers emitting at wavelengths $\lambda_1, \lambda_2, \ldots \lambda_N$. The parameter M determines the number of pump lasers as well as the number of inputs of the pump-multiplexing coupler and can be smaller or equal to parameter N that determines the number of optically pumped lasers. The fiber laser outputs are passed through N isolators before entering N modulators were the signals are monolithically modulated. The outputs of the modulators are passed through an array of N tunable attenuators. Finally all the individual channel outputs are recombined into a single output in a combiner. The output will typically lead to an optical network. The proposed architecture may also be used for optical amplifiers, especially fiber-based optical amplifiers.

10 Claims, 6 Drawing Sheets

U.S. PATENT DOCUMENTS 5,946,130 A * 8/1999 Rice .......................... 359/349
6,122,413 A * 9/2000 Jiang et al. ..................... 385/1
6,137,613 A * 10/2000 Ushirozawa ................. 398/94
6,445,477 B1 * 9/2002 Madsen et al. ............. 398/192

FOREIGN PATENT DOCUMENTS

WO          92 05642 A      4/1992

OTHER PUBLICATIONS

Aisawa, S. et al. "Ultra-wide band, long distance WDM transmission demonstration: 1 Tb/s (50×20 Gb/s), 600km transmission using 1550 and 1580nm wavelength bands." *OFC 98 Technical Digest, paper PD11* 1998.

Kringlebotn, J. T. et al. "Er3+:Yb3+-codoped fiber distributed-feedback laser." *Optics Letters*. 19.24 (Dec. 1994): 2101-3.

Loh W H et al: "High Performance Single Frequency Fiber Grating-Based Erbium/Ytterbium-Codoped Fiber Lasers", Journal of Lightwave Technology, Jan. 1998.

Ibsen M et al: "8- and 16-Channel All-Fiber DFB Laser WDM Transmitters With Integrated Pump Redundancy", IEEE Photonics Technology Letters, Sep. 1999.

* cited by examiner

WDM TRANSMITTER

This application is a continuation-in-part of International Application No. PCT/GB00/00583 filed Feb. 18, 2000, which is hereby incorporated herein by reference.

BACKGROUND OF THE INVENTION

The invention relates to a transmitter for wavelength division multiplexed signals.

Optical fiber telecommunication systems are undergoing continual expansion, fuelled by the need for more bandwidth. The nature of the expansion in demand for bandwidth is such that wavelength division multiplexing (WDM) of optical channels is required to overcome the bottleneck in capacity which arises in time-division-multiplexed (TDM), single-wavelength systems due to speed limitations of electronic circuits. State-of-the-art commercial systems use up to sixteen simultaneous channels to increase system capacity but the demand for capacity will continue to increase.

Although the capacity of the third telecommunications window is very large, loss limitations dictate that optical amplifiers are essential building blocks in modem networks and optical amplifiers, in particular erbium-doped fiber amplifiers (EDFA), determine the currently available practical bandwidth.

Current trends are towards dense wavelength division multiplexing with a 100 GHz channel spacing as the next generation of WDM comb standards.

For example, recent experiments have demonstrated 1 Tb/s transmission using 100×10 Gb/s as described in A. K. Srivastava et al., "1 Tb/s transmission of 100 WDM 10 Gb/s channels over 400 km of TrueWave™ fiber", in *OFC '98 Technical Digest*, paper PD10, 1998.

Another example is the demonstration of transmission using 50×20 Gb/s WDM channels over 400 km and 600 km as described in S. Aisawa, T. Sakamoto, M. Fukui, J. Kani, M. Jinno and K. Oguchi, "Ultra-wide band, long distance WDM transmission demonstration: 1 Tb/s (50×20 Gb/s), 600 km transmission using 1550 and 1580 nm wavelength bands", in *OFC '98 Technical Digest*, paper PD11, 1998.

There are two alternative approaches to implement high quality sources for telecommunication purposes, namely the semiconductor and the fiber distributed-feedback (DFB) laser. Commercial systems and most experimental systems being studied so far, for example the systems referred to in the above references, use various types of semiconductor lasers (SLs) as sources, for example DFB or DBR lasers. SLs are powered individually and are usually wavelength-stabilized (in order to meet the stringent telecom grid requirements) by the use of an external cavity. It is also well known that SLs are prone to aging effects and sudden failures resulting in a complete loss of the corresponding communication channel. This renders SLs quite unsuitable for integration, since failure of a single laser implies replacement of the entire integrated chip.

Fiber DFBs have been studied for the last few years since their first development at Southampton University, as reported in J. T. Kringlebotn, J.-L. Archambault, L. Reekie and D. N. Payne: '$Er^{3+}$:$Yb^{3+}$-codoped fiber distributed-feedback laser', *Optics Letters*, 19(24), 2101–3, December 1994. Fiber DFB lasers have potential advantages in terms of wavelength setability and stability, as well as reliability, longevity and cost, such that they appear as a promising alternative to semiconductor laser sources. In addition and most importantly, there is no known degradation and failure mechanism for fiber or waveguide DFB lasers. Fiber and waveguide DFB lasers, though, still rely on high power semiconductor lasers for efficient pumping and large output powers.

In an article W. H. Loh, B. N. Samson, L. Dong, G. J. Cowle and K. Hsu, "High performance single frequency fiber grating-based erbium:ytterbium-codoped fiber lasers", J. Lightwave Technology, vol. 16, no. 1, pp. 114–118 (1998) it is suggested that an array of semiconductor pump lasers can be used to power an array of fiber lasers. Specifically, in the above-referenced article there is proposed a 16-channel WDM transmitter in which the light outputs from all 16 pump lasers are combined and redistributed to 16 fiber lasers using a 16×16 splitter. In this case, each fiber laser is equally fed by all pump lasers and, therefore, failure of an individual pump laser will result in only a small reduction in the transmitter power of each channel supplied by the associated fiber laser.

The suggested architecture is limited to equal numbers of pump lasers and fiber lasers which may be undesirable for 16+ channel WDM transmitters in that an excessive number of pump lasers is needed. Moreover, it is generally undesirable to use a splitter in the suggested manner for large numbers of channels, since the power of all the pump lasers is localized in the active part of the splitter leading to undesirable non-linear effects. Furthermore, the suggestion in the article is limited to providing tolerance against pump failure, whereas a mechanism for positive failure recovery would be more desirable.

SUMMARY OF THE INVENTION

According to the invention there is provided an optical transmitter comprising: a pump laser array of up to M pump lasers for producing respective pump beams; a M×N multiplexer having M inputs and N outputs, the pump lasers being connected to receive the pump beams from respective ones of the M inputs; and a fiber laser array of up to N fiber lasers, the N outputs of the multiplexer being connected to pump respective ones of the fiber lasers.

In one embodiment, the multiplexer is configured so that a pump beam received at any one of its M inputs is internally routed to all of its N outputs.

In another embodiment, the multiplexer is subdivided into a plurality of modules, wherein each module is decoupled from the other module or modules, and wherein each module is configured so that a pump beam received at any one of the inputs of the multiplexer associated with that module is internally routed to all of the outputs of that module.

The ratio of outputs to inputs, N/M, may be greater than one, for example an improper fraction or an integer power of two. This has the important advantage of allowing the level of pump redundancy to be selected independently of the number of WDM channels. Clearly, for a 16, 32 or higher channel WDM, the number of pump lasers needed for redundancy will not generally be as high as the number of WDM channels.

In embodiments of the invention, the multiplexer has a configuration comprising a plurality of multiplexing locations where the pump beams are multiplexed, the configuration being such that no more than one half the total power of the pump beams can interact at any one of the multiplexing locations. This can be achieved with arrayed waveguide gratings (AWGs) or fiber couplers at the multiplexing locations. By avoiding combining all the power of the pump beams at a single location, such as with the splitter suggested in the prior art referred to above, there is the important advantage that higher pump powers can be used without inducing undesirable non-linear effects.

The transmitter may advantageously be provided with additional feedback to provide automatic recovery from pump laser failure and maintenance of WDM channel output power. To do this, a power monitoring device can be arranged to measure power at a point in the transmitter after the multiplexer and a feedback control device connected to control the pump lasers responsive to the power measured by the power monitoring device. The power monitoring device may be conveniently arranged to measure power at the fiber lasers, for example at the output or input thereof.

BRIEF DESCRIPTION OF THE DRAWINGS

For a better understanding of the invention and to show how the same may be carried into effect reference is now made by way of example to the accompanying drawings in which.

DETAILED DESCRIPTION

In the following we disclose a fully integrated transmitter module for DWDM applications.

First Embodiment

Figure 1:
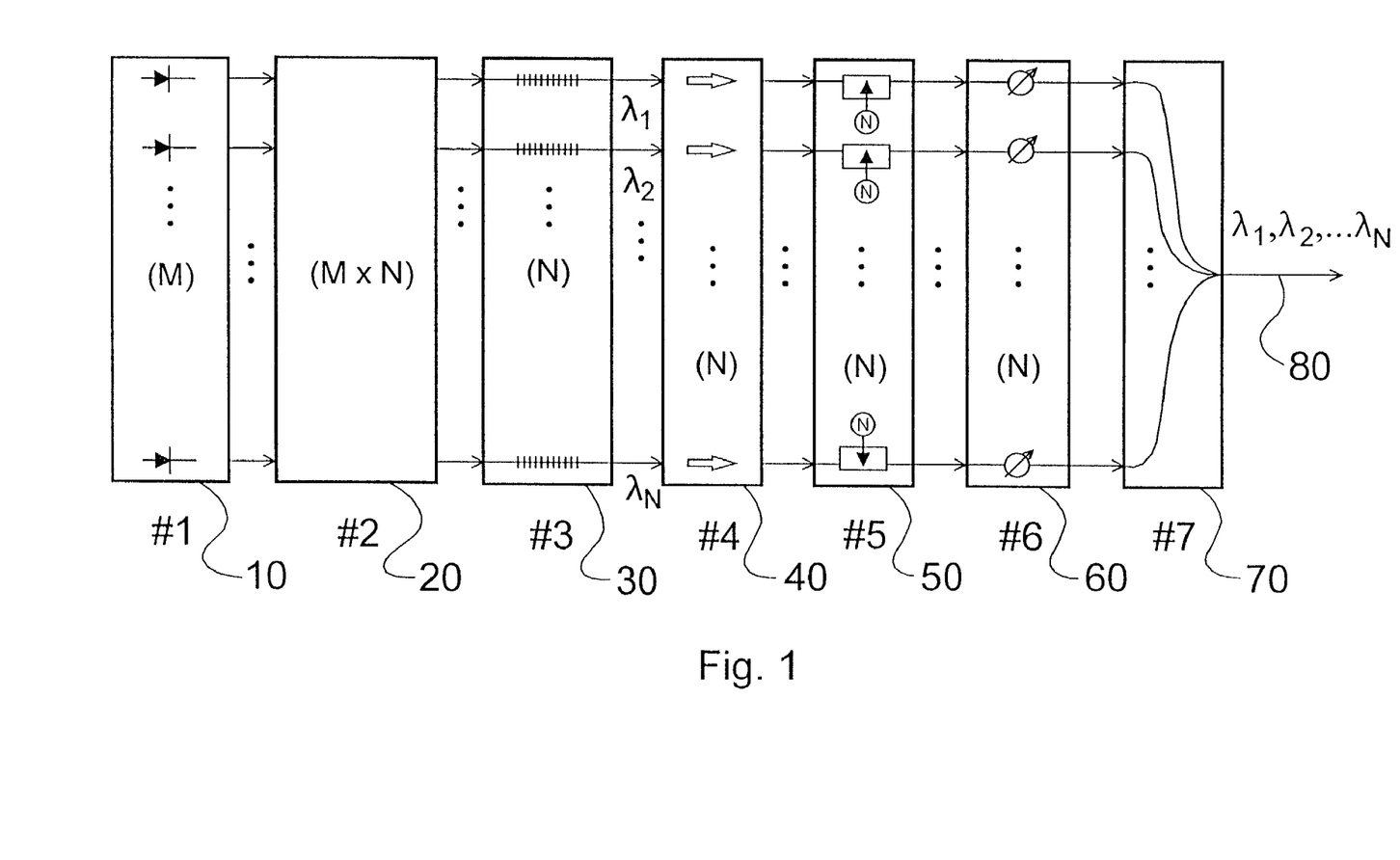
FIG. 1 is a schematic diagram of a transmitter according to the first embodiment.

FIG. 1 shows schematically the general configuration of the proposed module. An array of M pump lasers 10 (stage#1) are multiplexed by an M×N multiplexer, in the form of a coupler 20, (stage#2) and used to feed an array of N optically pumped fiber lasers 30 emitting at wavelengths $\lambda_1, \lambda_2, \ldots \lambda_N$ (stage#3). The parameter M determines the number of pump lasers as well as the number of inputs of the pump-multiplexing coupler and can be smaller or equal to parameter N that determines the number of optically pumped lasers. The fiber laser outputs are passed through N isolators 40 (stage#4) before entering N modulators 50 (stage#5) were the signals are monolithically modulated. The outputs of the modulators are passed through an array of N tunable attenuators 60 (stage#6). Finally all the individual channel outputs are recombined into a single output 80 in a combiner 70 (stage#7). The output 80 will typically lead to an optical network.

Stage#1 comprises M pump lasers that can be electrically or optically driven. The parameter M can be larger or equal to 2. The pump lasers emit at any appropriate wavelength and power level to optically pump the laser cavities of stage#3. As an example, appropriate pumping wavelengths can be in the regions of 980 nm, 1060 nm, 1480 nm, to mention a few.

The M×N multiplexer (stage#2) can be any composite coupled-waveguide or fiber structure that splits any of the M inputs equally into any of the N outputs. As already mentioned, M is smaller or equal to N. The pump multiplexers can be based on single N×N fused (or multimode) couplers, or concatenated 2×2 couplers (50:50 at the pump wavelength). The couplers can be in fiber or planar waveguide form. Another example of pump multiplexer is the arrayed waveguide grating (AWG) which is particularly attractive for large M. Typical values of N is 2, 4, 8, 16 . . . 256 . . .

The optically-pumped laser section (stage#3) will comprise of N fully thermally-stabilized and optimized individual single-polarization fiber or waveguide DFB or DBR lasers. Fiber or waveguide DFBs can be fabricated in a material doped with an appropriate rare earth that provides sufficient gain over a certain bandwidth anywhere within the 800 nm to 1900 nm range. $Er^{3+}$ and $Er^{3+}/Yb^{3+}$ are two examples of such appropriate dopants that provide gain at the 1550 nm window. The optically pumped lasers can also be based on semiconductor technology.

The isolator array (stage#4) is introduced to eliminate feedback due to fiber splices or waveguide refractive-index/modal-field mismatches or Rayleigh backscattering and avoid laser output frequency and power instabilities.

For the modulation of the optical signal in stage#5, a number of different modulators can be used, such as LiNbO3 modulators or chi(2)-based electro-optic modulators. In stage#6 the individual channels are passed through an array of N variable optical attenuators that are used to adjust their output powers. The optical attenuators can be electrically or optically controlled by tapping out and monitoring a small portion of their output. The variable optical attenuator array can be used to either equalize the optical powers or adjust them appropriately (pre-emphasis) before launching them into an amplified optical link. The attenuator array can be alternatively inserted between stages#3 and #4 or #4 and #5. In stage#7, all the modulated and properly adjusted channel outputs are recombined into a single output for launching into the optical network. The recombiner circuitry can be based on planar waveguide or fiber optical technology.

If we define as pump redundancy the amount of relative pump reduction (in %) when one of the pump lasers fails, it can be easily realized that the proposed M×N (M≦N) pump multiplexer, in FIG. 1, can provide (1/M) % pump redundancy. In most telecom applications, a pump redundancy of ~10% will usually suffice. For M≧16, it is clear that the proposed M×N pump multiplexer provides excessive pump redundancy. On the other hand, for M≧16 the complexity of or the number of components required for the pump multiplexer increases dramatically and renders the implementation of such device either impractical or impossible or extremely expensive. To ease the design, improve the performance or reduce the cost of the pump multiplexer (stage#2), we propose a different approach.

Second Embodiment

Figure 2:
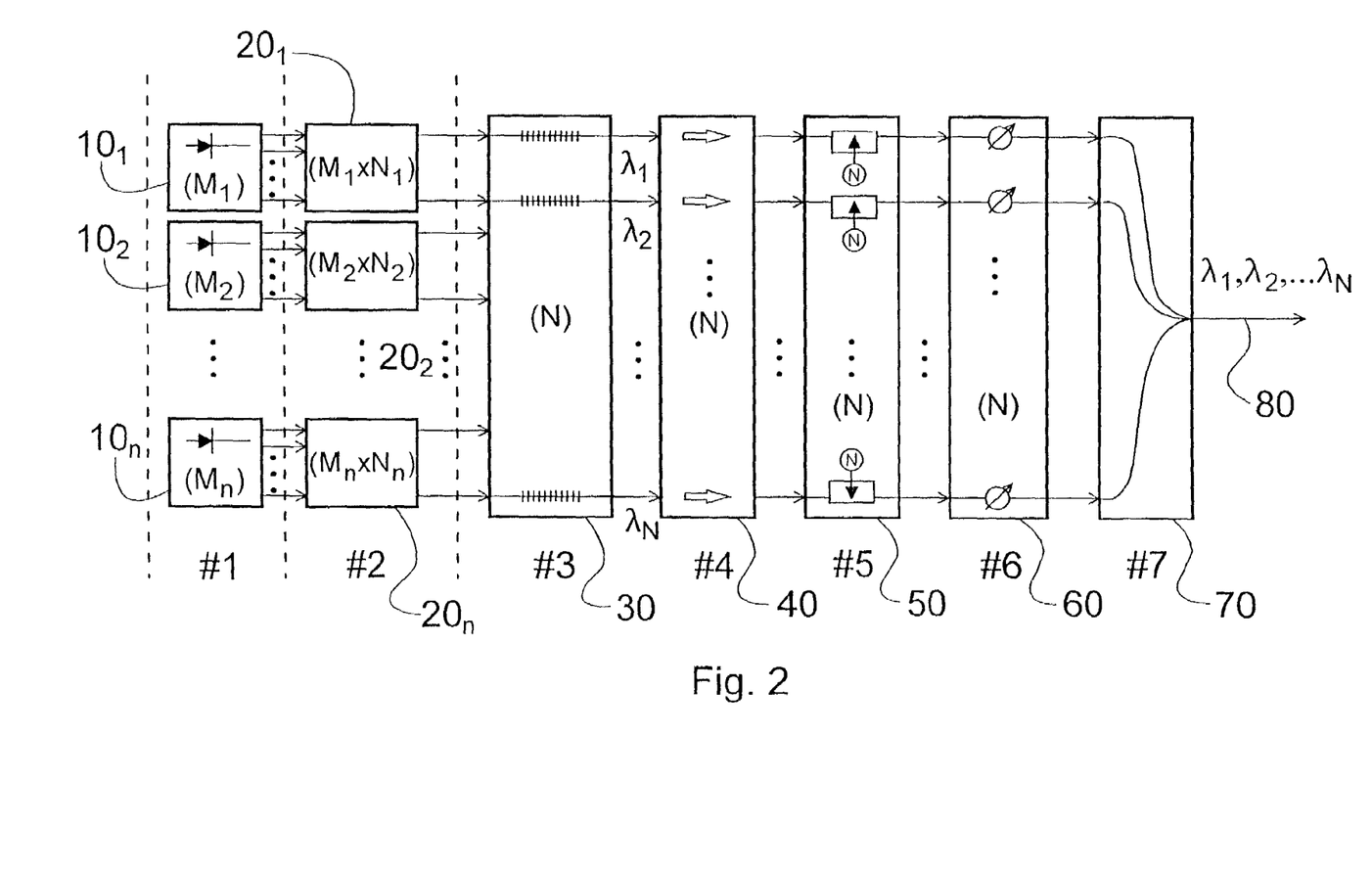
FIG. 2 is a schematic diagram of a transmitter according to the second embodiment.

FIG. 2 shows an embodiment taking such an approach. The pump redundancy is applied in n blocks of Mi pumps $10_1, 10_2 \ldots 10_n$, where Mi (i=1,2 . . . n)<M and M1+M2+. . . +Mn=M. Each block of Mi (i=1,2, . . . n) pumps is feeding a block of Ni (i=1,2 . . . n) optically pumped lasers $20_1, 20_2 \ldots 20_n$, where Ni (i=1,2 . . . n)<N and N1+N2+. . . +Nn=N, through a Mi×Ni pump multiplexer. In this case the overall pump redundancy provided by the multiplexer is (1/Mp) %, where Mp is the minimum Mi. The rest of the stages are the same as FIG. 1.

As an example of the complexity reduction provided by the scheme of FIG. 2, let us consider two different implementations of a 128×128 pump multiplexer. If the N×N multiplexer (where N=$2^m$) is comprised of concatenated 2×2 couplers, it can be easily shown that the total number of required couplers is $C=m2^{m-1}$. In the configuration of FIG. 1, $M=N=2^7$, (m=7) and therefore the number of required couplers is $7\times2^6=448!!!$. The pump redundancy in this case is 0.008%. However, the total splice and radiation losses will make this very expensive solution impractical. If on the other hand we adopt the strategy of FIG. 2 instead and divide the pump multiplexing unit in 16 blocks of 8 inputs each, then M1=M2=. . . M16=8 and the total number of 2×2 couplers is reduced to $16\times(3\times2^2)=16\times12=192$. Each block involves only 12 couplers and therefore shows massively reduced insertion loss. Such an approach not only halves the cost of the unit, but also reduces the insertion loss to very small levels. The pump redundancy in this case is ~12%, very close to the 10% target. Adoption of the same strategy in planar waveguide, or AWG based multiplexers will result in similar benefits.

Stages #1 to #6, in FIGS. 1 and 2, can be either separate units connected optically together or they can be combined into integrated subgroups connected together. Each subgroup can contain two or more of the aforementioned stages. They can also all be integrated on a single all-planar or hybrid waveguide chip to produce a fully integrated and robust transmitter module. The integrated chip can be based on glass or LiNbO3 technology or any other appropriate integrated optics technology. In the case that all stages are fully integrated in one chip or stages #3, #5, #6 and #7 constitute the only fully integrated subgroup, the isolator array (stage#4) can be ignored and replaced with a single isolator at the combined output of the integrated transmitter (to avoid the deleterious effects of Rayleigh back-scattering produced by the fiber-optic link). The transmitter topologies (FIG. 1 and 2) disclosed here require each optically-pumped-laser output being on a separate fiber or waveguide so that it can be easily interfaced with the optical modulator. The laser array is fully protected from back reflections by the intervened isolators. A single pump can be used to pump a number of lasers by splitting the pump output and distributing it to a number of optically pumped lasers. Reliability of the module is an important issue, and this can be improved by multiplexing and splitting a number of pump lasers and distributing the power to the optically pumped lasers. The loss of a single pump laser will then not cause the loss of any channels. The drive currents of the remaining pump lasers could be increased to compensate for the lost laser, if sufficient margin has been built in, until the failed unit is replaced. The wavelength separation of the optically pumped lasers can be designed with flexibility but it is proposed to generate a 100 GHz optical comb or any other comb compatible with the ITU grid. All laser outputs, after being modulated, are recombined into one output so that they can all be launched into the optical communication network.

FIRST EXAMPLE

Figure 3:
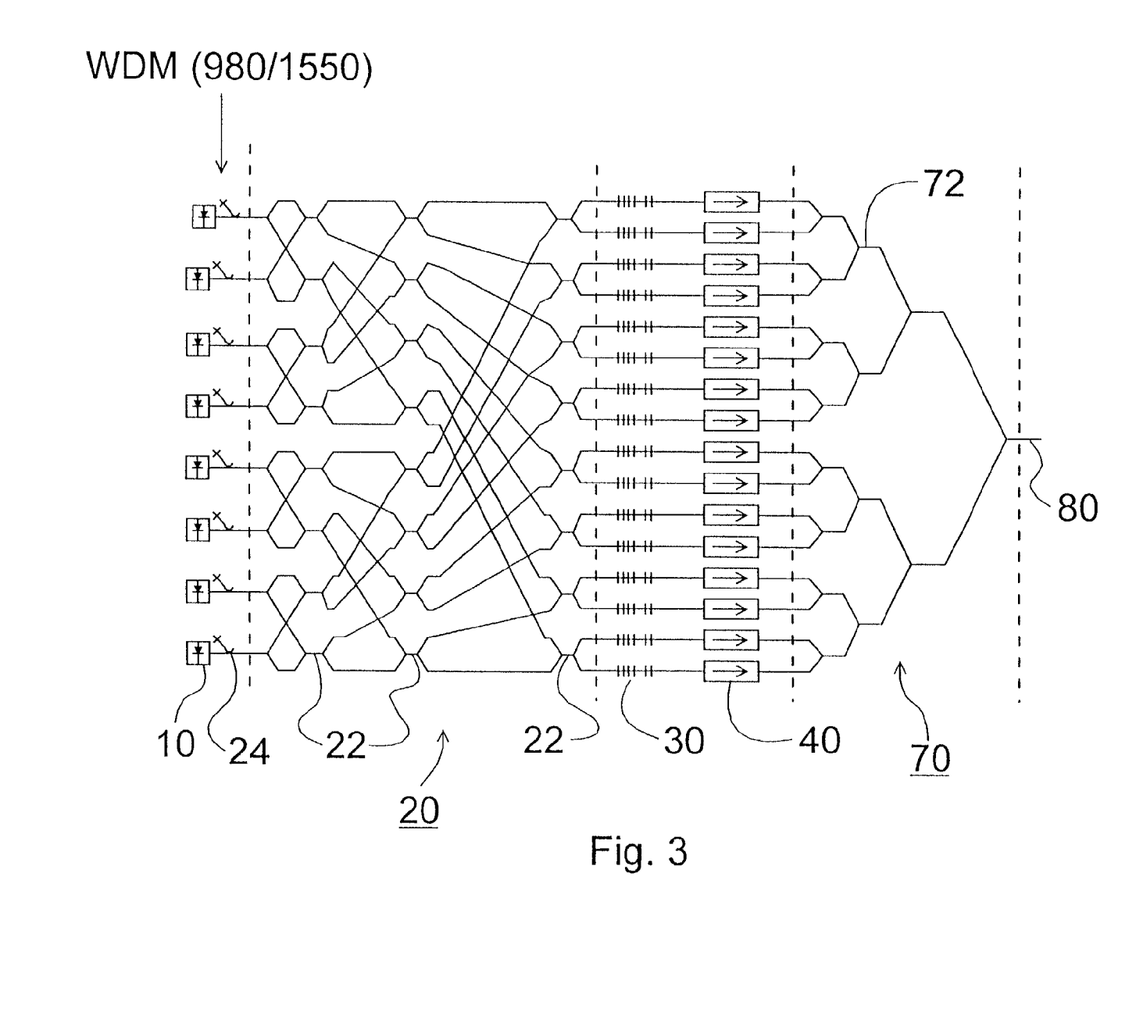
FIG. 3 shows an 8-channel pumped 16-channel fiber laser WDM transmitter according to a first example.

FIG. 3 shows an example of an integrated 16-channel WDM Transmitter that uses eight 980 nm pump lasers 10 (stage#1). The pump redundancy scheme (stage#2) is all fiber and comprises an 8×16 all-fiber star coupler 20 consisting of twenty-four 2×2 fiber couplers 22 (50:50@980 nm). Stage#3 consists of a sixteen channel 50 GHz fiber DFB array, more especially sixteen single-polarization, unidirectional fiber DFB high power lasers 30 at 1550 nm. Stage#4 includes sixteen pigtailed fiber isolators 40. Stage#6, the combiner stage, is an all fiber multiplexer 70 comprised of fifteen 2×2 fiber couplers 72 (50:50@1550 nm). The optical modulators (stage#5) and optical attenuator (stage#7) arrays are not illustrated in this example for the sake of convenience, and could also be omitted in practice if desired. It should, however, be stressed that the pump stage 10 (stage#1) includes an additional WDM coupler 24 (980/1550 nm) in front of each pump source, i.e. eight in total, in order to filter out the residual laser power (at 1550 nm) that leaks out the back-end of the DFB lasers and propagates in the backward direction.

SECOND EXAMPLE

Figure 4:
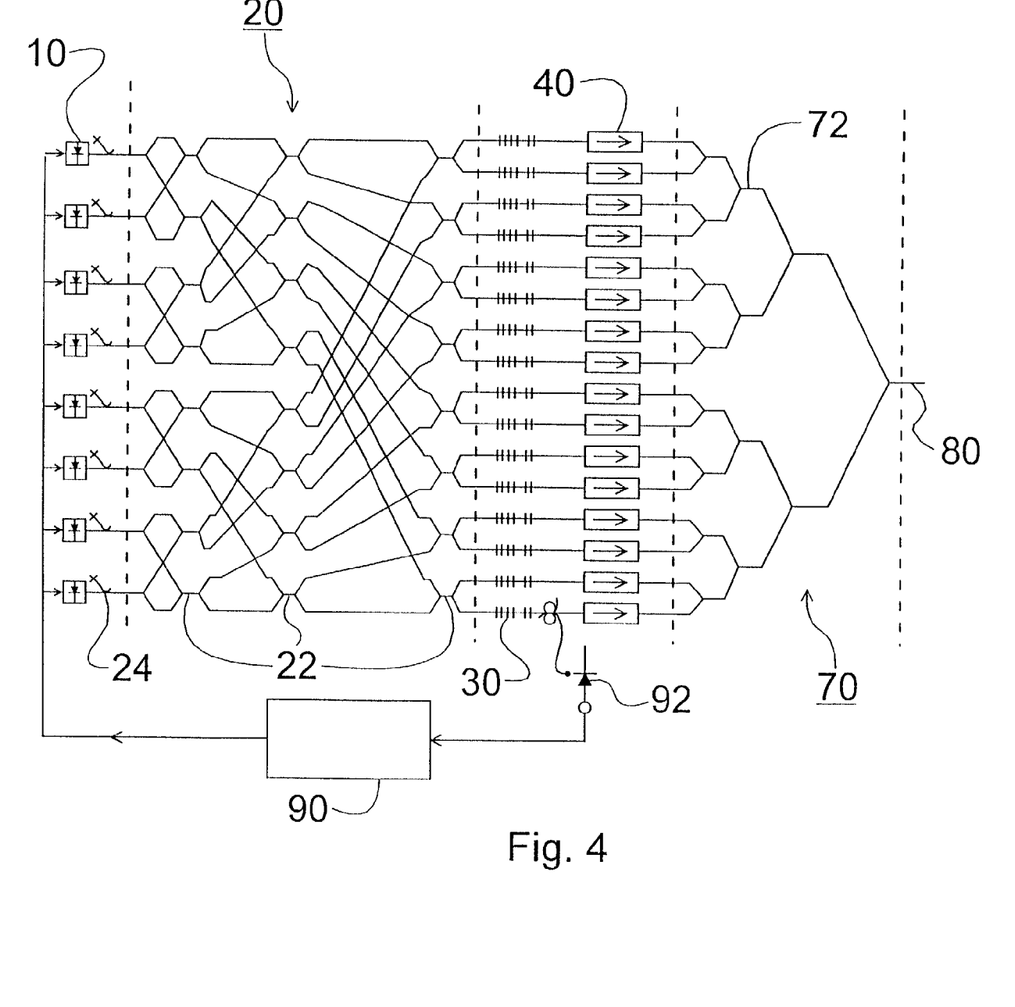
FIG. 4 shows an 8-channel pumped 16-channel fiber laser WDM transmitter according to a second example.

FIG. 4 shows an integrated WDM Transmitter similar to that of FIG. 3 with additional feedback control. The pump redundancy scheme (stage#2) in FIG. 1, ensures that any pump power reduction, due to one or more pump failures, is equally distributed among the optically pumped laser array (stage#3). In the example of FIG. 3, the output powers from the fiber lasers 30 are thus all reduced by the same amount.

To convert this passive tolerance to pump laser failure into an active recovery mechanism responsive to pump failure, a feedback control is used in the example of FIG. 4. Namely, the output power of one of the optically pumped lasers is monitored by a monitoring device 92, as shown in FIG. 4, which may comprise a coupler and photodiode detector as illustrated. The measured power is then fed back with a control unit 90 to the pump lasers 10. More specifically, the electrical power supplied to the pump lasers, e.g. injection current, is adjusted to restore the fiber laser output powers to the pre-failure level which can be a preset value. Further, as the faulty pump or pumps are replaced, the fiber laser output powers will remain stable through the same feedback mechanism which will dynamically reduce the power supplied to the pump lasers. Similar feedback control can be employed in the pump redundancy scheme of any of the embodiments and examples of the invention, although not explicitly illustrated or described.

In the case of the FIG. 2 embodiment, at least one laser corresponding to each block should be monitored and only the affected block of pumps is adjusted.

In all cases, the feedback can be provided by the variable attenuation feedback circuitry described in relation to the example of FIG. 4.

Moreover, it will be understood that the monitoring device 92 may instead be arranged on the input side of the fiber lasers 30, to measure the pump power supplied to one of the fiber lasers, rather than the fiber laser output. This would still provide the necessary feedback, since the pump power supplied at the input of each fiber laser is also a composite with contributions from all the active pump lasers. Still more generally, power can be measured for feedback purposes at any point downstream of the multiplexer, before or after the combiner stage.

THIRD EXAMPLE

Figure 5:
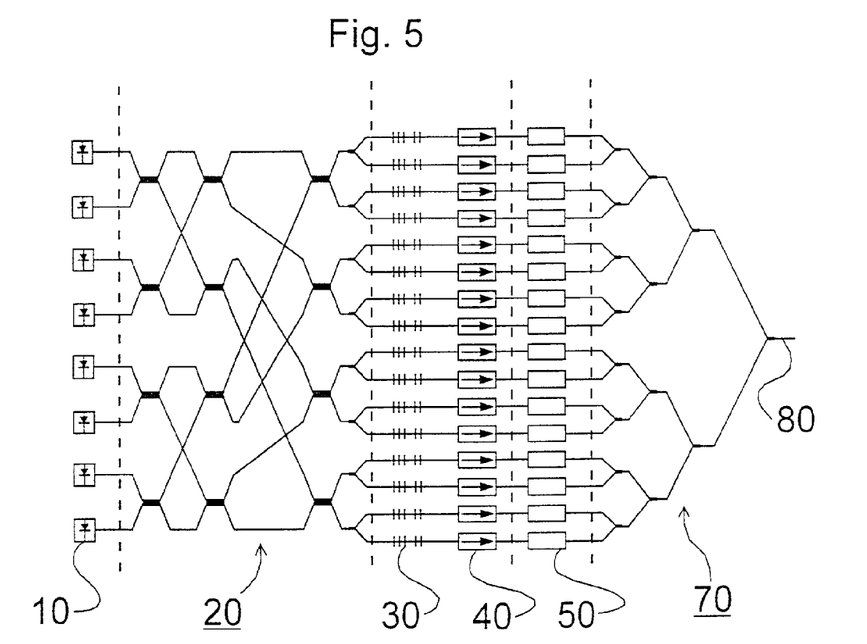
FIG. 5 shows an 8-channel pumped 16-channel fiber laser WDM transmitter according to a third example.

FIG. 5 shows an 8-channel pumped 16-channel fiber laser WDM transmitter according to a third example.

The use of a pump redundancy scheme is seen not only to allow for the failure of one or more pump-diodes, but also to provide the extra bonus of averaging any fluctuations in diode power. The extension of this scheme to provide 16 DFB fiber lasers with only eight pumps can be realized by splitting the eight outputs from the previous 8-channel scheme with an additional set of 3-dB couplers. This configuration is shown in FIG. 5 with a demonstration of how such a system would look with a modulator attached to each WDM channel output. To demonstrate such a system, 16 DFB fiber lasers now separated in frequency by 50 GHz were employed. Despite the reduced spacing to 50 GHz, a high signal-to-noise ratio (SNR) between adjacent channels is maintained. A splitting of the pump lasers to an extra eight fiber lasers reduces the output power from each of the transmitter lasers but produces a module with the same redundancy of ⅛. Additionally the increased pump splitting has the advantage of reducing the price of the transmitter module because more channels are available from the same number of pumps.

If a redundancy scheme based on 3-dB couplers is considered, the total number of couplers N, required to make an n×k channel system (n≦k) with subsequent redundancy of 1/n is $$N = 2^m \cdot \left( m + \sum_{i=0}^{h} 2^i \right) \quad (1)$$

where $n=2^{m+1}$ is the number of pumps and $k=2^{h+m+1}$ is the number of supported WDM channels. Depending on what pump redundancy and net output power from the sources is required, even a system consisting of the splitting of just four pumps to 16 lasers is from equation (1) seen to be possible with 16 3-dB couplers. Such a system will only have a redundancy of ¼ though but will provide a SNR between 50-GHz channels which is in excess of 50 dB with an output power of −20 dBm from each transmitter laser. This output level is possible to increase by employing more powerful pump sources and a multiplexer with less insertion loss than the one demonstrated here. This type of multiplexer is used in this case to demonstrate that it is practical to manufacture all-fiber transmitter sources.

FOURTH EXAMPLE

Figure 6:
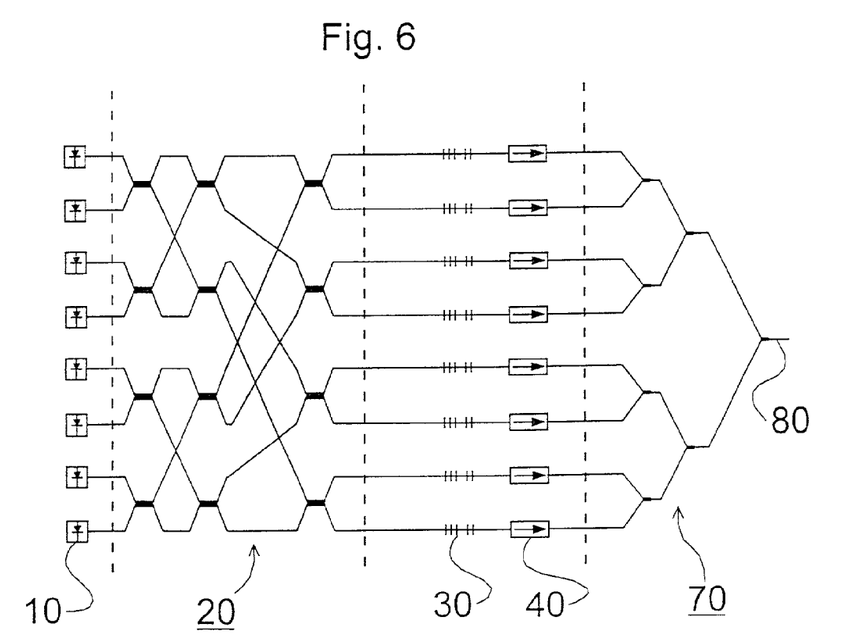
FIG. 6 shows an 8-channel pumped 8-channel fiber laser WDM transmitter according to a fourth example.

FIG. 6 shows an 8-channel pumped 8-channel fiber laser WDM transmitter according to a fourth example.

FIG. 6 shows a schematic of an 8-channel transmitter module. This module consists of eight pump diodes, a pump redundancy unit and eight asymmetric all-fiber DFB lasers of length 5 cm with isolators on the output end. The principle of the pump redundancy module is to split the powers from the pumps equally between the DFB-fiber lasers, such that each laser still will receive the pump power corresponding to that provided by one pump diode. The particular module is made up of 2×2 3-dB couplers at 980 nm and equal splitting of eight inputs to eight outputs is obtained with 12 couplers. The total insertion loss for each pump input channel in this 8-channel module is ~1 dB. A single 8×8 splitter would provide the same splitting principle.

Eight DFB fiber lasers separated in frequency by 100 GHz were made using a continuous grating writing technique with continuous wave (CW) 244-nm ultra-violet (UV) light and a phase-mask assembly. The grating writing technique is described in WO98/08120. The lasers all operate in a single polarization mode with a purity of >40 dB and with a single-sided output power ratio of ~50:1. The slope efficiency of the lasers is ~25% and using the pump redundancy scheme with ~50 mW (17 dBm) power from each pump diodes, results in CW output powers of ~5 dBm±0.25 dBm from all the lasers. The outputs of the eight lasers are combined in an all-fiber multiplexer consisting of seven 1550-nm 3-dB splitters with a total insertion loss of ~10 dB.

Noise measurements of the lasers show RIN<−160 dB/Hz (f>10 MHz) with RIN<−165 dB/Hz for frequencies larger than 30 MHz, indicating very quiet sources with performance well suited for high speed communication systems.

Third Embodiment

Figure 7:
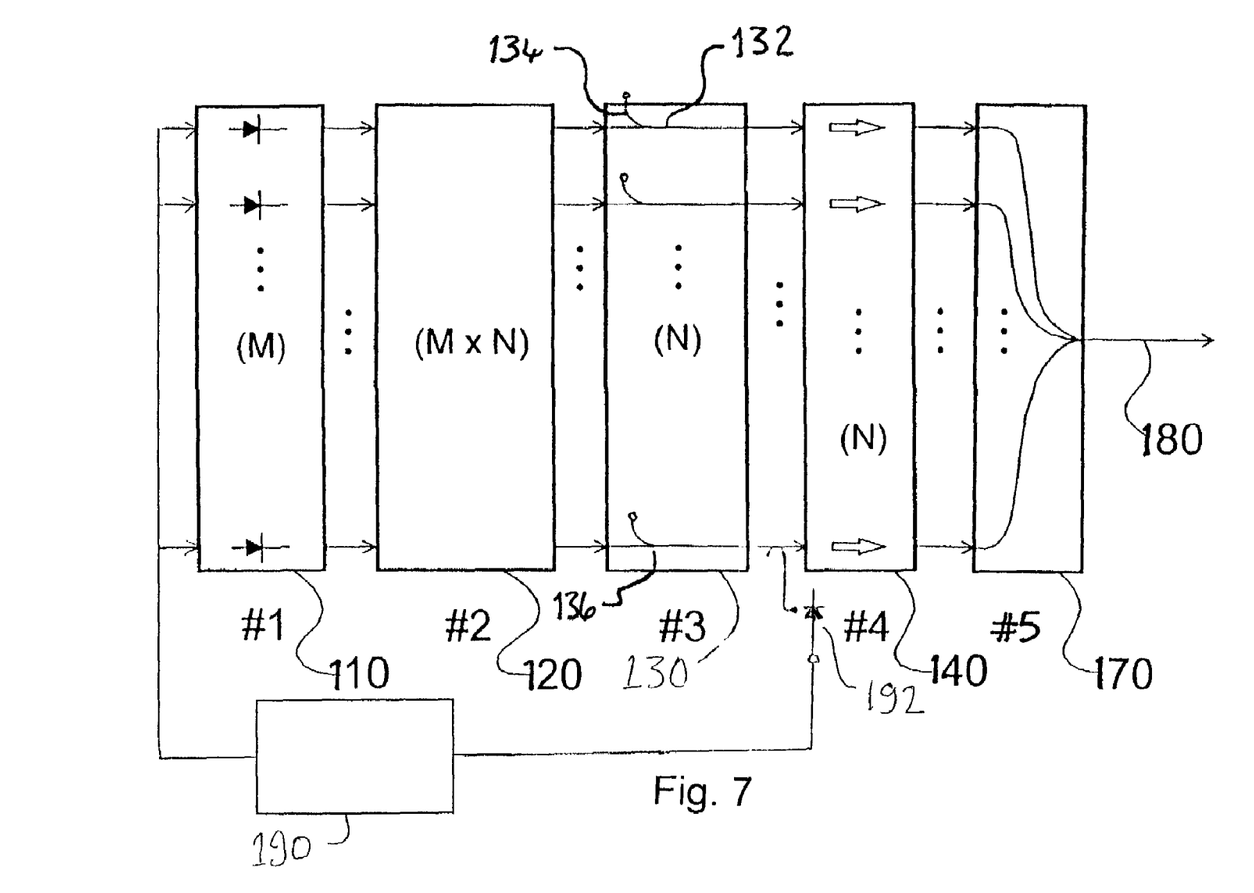
FIG. 7 is a schematic diagram of a transmitter according to a third embodiment.

FIG. 7 shows schematically the general configuration of a transmitter according to a third embodiment. The third embodiment may be understood by comparison with the first embodiment. Namely, in the third embodiment, the fiber lasers of the first embodiment are replaced with optical fiber amplifiers and the modulator and attenuator stages omitted. The third embodiment is particularly suited for use as a transmitter in an optical repeater, such as used in long-haul WDM optical fiber transmission lines.

An array of M pump lasers 110 (stage#1) are multiplexed by an M×N multiplexer, in the form of a coupler 120, (stage#2) and used to feed an array of N optically pumped fiber amplifiers 130. The fiber amplifiers 130 each comprise a gain section 132, for example formed by erbium or other rare earth doping, and a fiber coupler 136 for introducing a signal to be amplified from an input line 134. Alternatively, semiconductor optical amplifiers could be used instead of fiber amplifiers for the optical amplification. The parameter M determines the number of pump lasers as well as the number of inputs of the pump-multiplexing coupler and can be smaller or equal to parameter N that determines the number of optically pumped lasers. The fiber amplifier outputs are passed through N isolators 140 (stage#4). The isolator array is introduced to eliminate feedback due to fiber splices or waveguide refractive-index/modal-field mismatches or Rayleigh backscattering and avoid output frequency and power instabilities. Finally all the individual channel outputs are recombined into a single output 180 in a combiner 170 (stage#5).

Other comments relating to the first embodiment also apply to the third embodiment. Moreover, the second embodiment and its examples may be modified by replacing the fiber lasers with optical amplifiers to create further embodiments. Specifically, the modular construction of FIG. 2 may be incorporated. Moreover, the power scheme monitoring design of FIG. 4 may be used, as illustrated in FIG. 7, with a power monitoring device 192 and control unit 190 which are similar to the analagous components of the FIG. 4 embodiment.

Summary & Further Variants

It will be understood that there may be fewer than M pump lasers. That is, it is not essential that every one of the multiplexer inputs is active. This will effectively occur in any case on pump laser failure.

Similarly, there may be fewer than N fiber lasers or optical amplifiers. That is, it is not essential that every one of the multiplexer outputs is utilized.

Moreover, it is not necessarily the case for all applications that the output from the fiber laser or optical amplifier array will need to be combined into a single output line, in which case the combiner stage would be omitted.

If provided, the power monitoring device may be arranged to tap power at any point subsequent to the multiplexer, so may be arranged after the second, third, fourth, fifth or sixth stages of the first or second embodiments, or after the second, third or fourth stages in the third embodiment.

The invention claimed is:

1. An optical transmitter for a WDM system having multiple WDM channels comprising:
   a pump laser array of up to M pump lasers for producing respective pump beams;
   a M×N multiplexer having M inputs and N outputs, the M inputs being connected to receive the pump beams from respective ones of the pump lasers, wherein the multiplexer is subdivided into a plurality of modules, wherein each module is decoupled from the other module or modules, and wherein each module is configured so that a pump beam received at any one of the inputs of the multiplexer associated with that module is internally routed to all of the outputs of that module; and
   a fiber laser array of up to N fiber lasers operable to emit at respective wavelengths $\lambda_1, \lambda_2, \ldots \lambda_N$ for respective ones of the multiple WDM channels, the N outputs of the multiplexer being connected to pump respective ones of the up to N fiber lasers.

2. A transmitter according to claim 1, wherein the multiplexer is configured so that a pump beam received at any one of its M inputs is internally routed to all of its N outputs.

3. A transmitter according to claim 1, where N/M is equal to an integer power of two.

4. A transmitter according to claim 1, wherein the multiplexer has a configuration comprising a plurality of multiplexing locations where the pump beams are multiplexed, the configuration being such that no more than one half the total power of the pump beams can interact at any one of the multiplexing locations.

5. An optical transmitter for a WDM system having multiple WDM channels comprising:
   a pump laser array of up to M pump lasers for producing respective pump beams;
   a M×N multiplexer having M inputs and N outputs, the M inputs being connected to receive the pump beams from respective ones of the pump lasers;
   a fiber laser array of up to N fiber lasers operable to emit at respective wavelengths $\lambda_1, \lambda_2, \ldots \lambda_N$ for respective ones of the multiple WDM channels, the N outputs of the multiplexer being connected to pump respective ones of the up to N fiber lasers; and
   a power monitoring device arranged to measure power at a point in the transmitter after the multiplexer and a feedback control device connected to control the pump lasers responsive to the power measured by the power monitoring device.

6. A transmitter according to claim 5, wherein the multiplexer is configured so that a pump beam received at any one of its M inputs is internally routed to all of its N outputs.

7. A transmitter according to claim 5, where N/M is equal to an integer power of two.

8. A transmitter according to claim 5, wherein the multiplexer has a configuration comprising a plurality of multiplexing locations where the pump beams are multiplexed, the configuration being such that no more than one half the total power of the pump beams can interact at any one of the multiplexing locations.

9. A transmitter according to claim 5, further comprising fiber couplers to provide the multiplexing locations.

10. A transmitter according to claim 5, wherein the power monitoring device is arranged to measure power at an input or output side of at least one of the fiber lasers.

* * * * *